(12) United States Patent
Rincon et al.

(10) Patent No.: US 6,934,039 B2
(45) Date of Patent: Aug. 23, 2005

(54) METHOD AND APPARATUS FOR MEASUREMENT OF A CONSUMABLE ELECTRODE

(75) Inventors: Hernan Rincon, Bogota (CO); Jorge Reyes, Bogota (CO)

(73) Assignee: QNI Technology PTY LTD (AU)

( * ) Notice: Subject to any disclaimer, the term of this patent is extended or adjusted under 35 U.S.C. 154(b) by 0 days.

(21) Appl. No.: 10/293,948

(22) Filed: Nov. 14, 2002

(65) Prior Publication Data
US 2003/0235231 A1 Dec. 25, 2003

Related U.S. Application Data

(63) Continuation of application No. PCT/AU01/00562, filed on May 16, 2001.

(30) Foreign Application Priority Data

May 17, 2000 (AU) ................................................ PQ7558

(51) Int. Cl.[7] ............................. G01B 11/24; H05B 7/09
(52) U.S. Cl. ........................... 356/601; 356/72; 373/89; 373/92
(58) Field of Search .............. 356/601, 72; 219/125.12, 219/124.34, 130.01; 350/227, 231 R, 231 P; 373/50, 70, 92, 94, 102, 105; 250/227, 231 R, 231 P

(56) References Cited

U.S. PATENT DOCUMENTS

| | | | |
|---|---|---|---|
| 4,096,344 A | | 6/1978 | Munson |
| 4,131,754 A | * | 12/1978 | Roberts ........................ 373/70 |
| 4,491,719 A | * | 1/1985 | Corby, Jr. .............. 219/124.34 |
| 4,527,329 A | * | 7/1985 | Bruff et al. ..................... 29/825 |
| 4,578,561 A | * | 3/1986 | Corby et al. ........... 219/124.34 |
| 4,696,014 A | * | 9/1987 | Orrling ......................... 373/89 |
| 4,843,234 A | | 6/1989 | Berthold et al. |
| 5,539,768 A | * | 7/1996 | Kracich ....................... 373/105 |
| 5,638,398 A | * | 6/1997 | Ikitsu et al. ................... 373/92 |
| 5,923,555 A | * | 7/1999 | Bailey et al. ................ 700/114 |
| 5,938,955 A | | 8/1999 | Ikeda et al. |
| 6,115,404 A | * | 9/2000 | Bertram et al. ................ 373/70 |
| 6,130,407 A | * | 10/2000 | Villafuerte ............. 219/130.01 |
| 6,178,191 B1 | | 1/2001 | Kalgraf et al. |

* cited by examiner

*Primary Examiner*—Gregory J. Toatley, Jr.
*Assistant Examiner*—Sang H. Nguyen
(74) *Attorney, Agent, or Firm*—Stites & Harbison PLLC; Marvin Petry

(57) ABSTRACT

A method of measuring the instantaneous parameters of a consumable electrode by: (a) providing a laser measuring device and positioning the laser measuring device in the vicinity of the electrode to be measured; (b) activating the laser measuring device to obtain data relating to the instantaneous parameters of the consumable electrode; and (c) transferring the data obtained from the laser measuring device to a computer data processing and storage device to determine the instantaneous parameters of the electrode.

17 Claims, 3 Drawing Sheets

METHOD AND APPARATUS FOR MEASUREMENT OF A CONSUMABLE ELECTRODE

RELATED APPLICATIONS

This application is a continuation of international application number PCT/AU01/00562, filed on May 16, 2001.

BACKGROUND OF THE INVENTION

The present invention relates to a method for the measurement of a consumable electrode and in particular to the use of a laser to measure the consumption of the electrode paste and the electrode casing of a consumable electrode in an electric arc melting furnace.

In one particular embodiment, a laser measuring means is mounted on a crane traveller above the operating electrodes, to allow for sequential measurement of more than one variable in each of a number of energised electrodes.

In a further embodiment, the present invention also relates to computer data processing and storage means capable of calculating data based upon the measurement data obtained from the laser measuring means. In particular, the computer data processing and storage means calculates the solid and liquid carbon paste heights, electrode casing height and the operating length of the electrode from the data obtained from the laser measuring means.

In the Ferro Nickel industry, selected ore types containing the oxides of iron, nickel, silica and magnesium are first treated in a roaster under reducing conditions to convert the oxides of iron and nickel to metallic species. This reduced matrix is then subjected to high temperatures produced in an electric arc furnace to coalesce the metal particles and form molten metal which is removed from the furnace base, cooled and usually granulated. The electric arc is struck between a graphite electrode and the molten metal. The graphite electrode may typically be about 1.8 meters in diameter. During this process, the electrode is eroded and consumed and requires continual renewing external to the furnace to maintain its operating length. This renewal is achieved by adding blocks of solid carbon paste, which liquefy when heated and then, as the electrode mass moves into the furnace, it is exposed to high temperatures and bakes solid. The baked electrode solid adheres strongly to the metal casing of the electrode so that pneumatic movement up and down of the casing changes the position of the electrode tip. It is the instantaneous length of the electrode relative to the molten metal in the furnace which has to be controlled to ensure stability of the electric arc length.

To ensure that the furnace functions correctly, the levels of electrode paste, namely the solid and liquid paste, and the electrode casing consumption are measured regularly. These variables have been measured manually in the past, however due to safety hazards involved, manual measurement was discontinued and measurement could only be achieved when the furnace was de-energised every three to four weeks for casing renewal and maintenance.

This length of time between measurements compromised the operating efficiency of the furnace because levels of solid and liquid paste should be determined regularly in order to control addition of paste to the electrode casing and operation of resistance heating of the paste.

While the need to monitor instantaneous electrode length including the solid and liquid paste levels has long been recognised, little attention has been given to electrode paste and electrode casing height measurements.

U.S. Pat. No. 4,834,234 summarises various techniques for measurement of a carbon electrode. This US patent describes a method using optical means (optical time domain reflectometry) which determines the position of the electrode tip within an arc furnace by incorporation of a fibre optic cable into the carbon electrode. This requires a physical connection between the measuring device and the electrode and does not address the measurement of levels of liquid and solid paste in the electrode casing or the consumption rate of the casing housing the electrode.

The above discussion of documents, acts, materials, devices and the like is included in this specification solely for the purpose of providing a context for the present invention. It is not suggested or represented that any or all of these materials form part of the prior art base or the common general knowledge in the field relevant to the present invention as it existed before the priority date of each claim of this application.

The present invention aims to overcome or at least alleviate one or more of the difficulties associated with the prior art as indicated above.

SUMMARY OF THE INVENTION

The present invention relates to a method of measuring the instantaneous parameters of a consumable electrode, said method including the steps of:

(a) providing a laser measuring means and positioning the laser measuring means in the vicinity of the electrode to be measured;

(b) activating the laser measuring means to obtain data relating to the instantaneous parameters of the consumable electrode; and (c) transferring the data obtained from the laser measuring means to computer data processing and storage means to determine the instantaneous parameters of the electrode.

The present invention further resides in computer data processing and storage means capable of determining various instantaneous parameters of the consumable electrode from the data transferred to the computer data processing and storage means from the laser measuring means.

The present invention further resides in an apparatus for measuring the instantaneous parameters of the consumable electrode, said apparatus including:

(a) a laser measuring means capable of obtaining data relating to the instantaneous parameters of a consumable electrode, and (b) computer data processing and storage means capable of determining the instantaneous parameters of the consumable electrode from data obtained from the laser measuring means, and transferred to the computer data processing and storage means.

DETAILED DESCRIPTION OF THE PREFERRED EMBODIMENTS

The method, computer data storage means and apparatus of the present invention aims to measure instantaneous parameters of a consumable electrode which electrode generally finds use in an electric arc furnace. The consumable electrode in an electric arc furnace is preferably graphite and generally has both a liquid component and a solid component. The electrode itself is generally created from blocks of solid carbon paste which are added to an electrode casing. The blocks of solid carbon paste liquefy when heated and then, as the electrode mass moves into the furnace, bakes solid upon exposure to higher temperatures. The baked electrode adheres strongly to the metal casing of the electrode, which is generally made of iron.

The electrode is eroded and consumed in operation, and requires continual renewal. This is generally achieved by adding further blocks of solid carbon paste. It is a desired feature of the present invention to enable measurement of certain instantaneous parameters of the consumable electrode while still in operation, to enable appropriate addition of the solid carbon blocks.

Generally, the instantaneous parameters of the consumable electrode to be determined include the instantaneous heights of the solid and liquid components of the consumable electrode; the instantaneous height of the electrode casing; the length of the electrode; and the change of length of the electrode in a given period of time. Other parameters may be measured, and the desired parameter may be calculated from data obtained from two or more measured parameters.

The laser measuring means is most preferably a laser. One example of a laser suitable for use in the present invention is Sentinel 100 (™) produced by Optech Systems Corporation of Canada. The Sentinel 100 has a range of 0.2 meters to 250 meters with an accuracy of +/−5 cm from 10° C. to 30° C. It operates on a 1 cm digital output resolution with a laser wavelength of 950 nm (+/−10 nm); a pulse repetition rate of 195 Hz and a beam divergence of 5 MRAD. Other laser measuring devices capable of obtaining measurement data are contemplated.

Preferably, the laser measuring means is positioned above the electrode to be measured. In this position the laser measuring means is able to access and measure the instantaneous heights of the solid and liquid components of the consumable electrode together with measurement of the electrode and the electrode casing.

The method preferably includes also providing a video camera and light source in conjunction with the laser measuring means. The laser measuring means, video camera and light source are most preferably positioned in a crane traveller that is operable to move above the electrode. The crane traveller may normally be used to add solid carbon paste blocks to the consumable electrode casing, and in one embodiment of the invention is able to perform that function when it is determined that additional carbon paste blocks are required.

The method of the present invention preferably includes means of measuring a predetermined number of distances internal and external to the electrode casing. These distances are measured by the laser measuring means and data relating to that measurement is transferred to the computer data processing and storage means. The laser measuring means can be controlled by an operator to establish the instantaneous length of predetermined parameters. The control means enables the operator to select the parameter to be measured and data relating to that parameter can be obtained, before determining the next parameter.

There are significant workplace safety hazards such as falls, exposure to noxious gases and possible electric shock associated with measuring the various parameters of an electrode manually. Consequently the ability to optically measure electrode paste heights and to make solid block paste additions while the electrode is energised, reduces workplace risk and increases operating efficiency. The present invention provides a method of measuring liquid paste and solid paste heights of the energised electrode as well as measuring the height of the electrode casing above a fixed point of reference thereby fixing the position of the electrode tip.

Once the length of the consumable electrode has been determined, if required a solid carbon block paste may be added to maintain the electrode at optimum operating length. A solid block may be added by utilising the crane traveller housing the laser measuring means and ancillary devices or by utilising a second crane traveller.

The present invention also allows the sequential measurement of the instantaneous parameters in a number of energised electrodes by utilising the crane traveller to carry the laser measuring means and ancillary devices to a position within the vicinity of a further electrode. The video camera and light source allow the operator to remotely view from above the electrode to be measured and to appropriately position the laser measuring device.

The operator has control means to enable the operator to activate the laser measuring means to measure the predetermined instantaneous parameter of the consumable electrode. The data obtained from the laser measuring means is transferred to the computer preferably by electronic means through insulated wiring. The computer data processing and storage means is able to determine the measured instantaneous parameter of the electrode and provide that information to the operator generally via a screen associated with the control panel. With this data, the operator is able to make assessments as to whether additional solid carbon blocks should be added to the consumable electrode, or whether in general the tip of the electrode requires repositioning. The instantaneous parameters that the computer data processing and storage means may determine include the instantaneous heights of the solid and liquid paste; the instantaneous height of the electrode casing; and the change of the length of the electrode over a given period of time. The computer data processing and storage means is capable of analysing the measurement data obtained by the laser measuring means and provide that information to the operator.

Advantageously the above procedures are achieved with a laser measuring means physically independent from the electrode being measured wherein the accuracy is not affected by any electrical interference from the energised electrode.

DETAILED DESCRIPTION OF THE DRAWINGS

The present invention will now be described with reference to the accompanying drawings. It should be understood that these drawings are merely illustrative of preferred embodiments of the invention and that the invention should not be construed as limited to these features.

Figure 1:
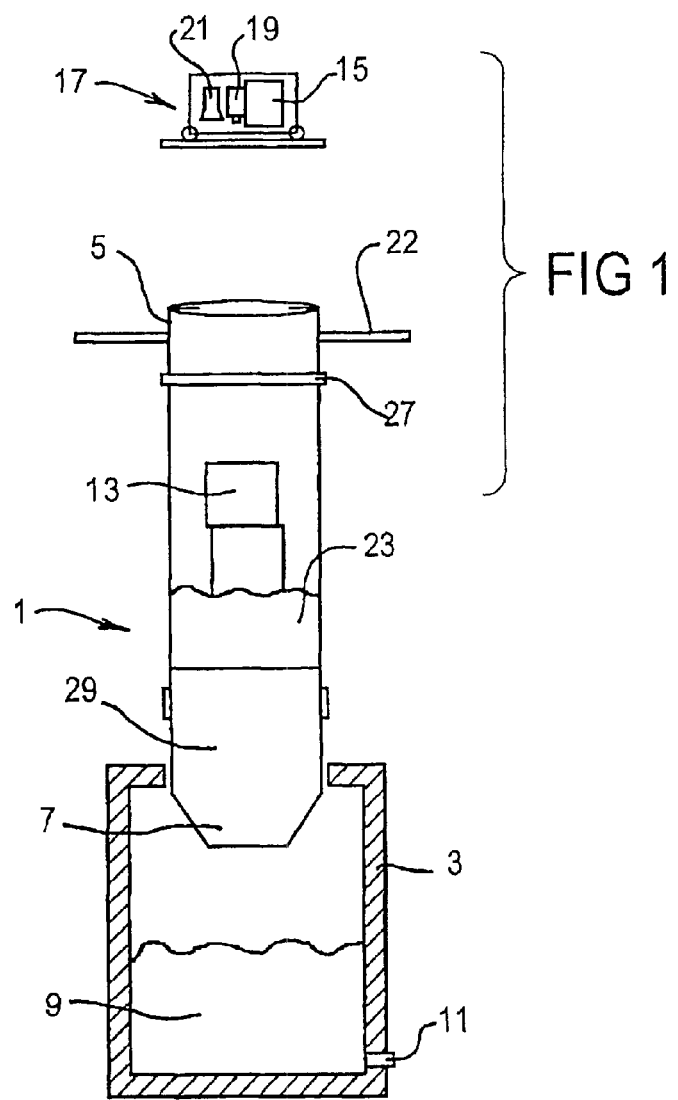
FIG. 1 is a side view of an electrode showing the relationship of the laser measuring means and ancillary components to the electrode.

FIG. 1 illustrates the major equipment items of a typical consumable carbon electrode furnace. It also shows the physical relationship of the laser measuring means according to the present invention to the consumable carbon electrode furnace. The electrode (1) which is being consumed during the operation of the furnace (3), may be moved up or down by hydraulic jacks (not shown) attached to the electrode casing (5) of the electrode. The casing (5) is strongly bonded to the solid carbon electrode (7) once the liquid paste (23) hardens to become a solid carbon electrode (29). The electrode casing (5) is also consumed during the operation of the furnace (3). There is however no contamination of the molten metal product (9), as generally, the casing is iron and the molten metal product is an iron nickel alloy.

The molten alloy (9) is drained from the bottom of the furnace through metal drain point (11). The molten alloy is then cooled and granulated prior to packaging and sale. As the electrode (1) is continuously being consumed while the furnace is energised, it must be re-generated by regular additions of solid carbon paste blocks (13). The crane traveller (17) may carry the solid carbon paste blocks and add the solid carbon paste blocks to the electrode casing by dropping the blocks from above the electrode casing, or may be manually loaded from the loading floor (22). Whether additional carbon paste blocks is/are required is determined by data obtained by the laser measuring means (15) which is mounted on a crane traveller (17) above the electrode. Data relating to the instantaneous parameters of the solid and liquid components is obtained by use of the laser measuring means (15) and transferred to the computer data processing and storage means, to determine if further solid blocks are required.

The laser measuring means is mounted together with a video camera (19) and a light source (21) on the crane traveller. The laser measuring means and the ancillary equipment is positioned over the electrode to be monitored by using hand held control buttons (32 in FIG. 3).

Generally, the measuring equipment is approximately 10 meters above the loading floor (22).

The relationship of the laser device to the surface requiring measurement is monitored by the operator viewing on a miniature screen, the image being generated by the video camera (19). The operator may utilize the laser measuring means and ancillary equipment and computer data processing and storage means as follows. Having aligned the laser measuring means over the selected electrode, the operator may initiate a series of measurements that determine the height of the liquid paste (23) within the electrode casing (5) at three separate points, the height of the electrode casing (5), the height of the electrode ring holder (27) and the height of the solid carbon paste (13) in the electrode casing (5).

Each of these measurements is carried out in sequence by positioning the laser measuring means, housed on the crane traveller, over each surface to be measured, and accepting by key stroke entry the data displayed on the computer screen before moving on to the next monitoring position for that electrode. Guidance instructions are displayed on the computer screen to enable the operator to calculate the final electrode values.

When all the measurements for the selected electrode are completed, a decision may be made to either view the calculated values for the electrode just monitored or initiate a similar monitoring program on the next selected electrode. This is simply done by using the hand held button controller with attached miniature video monitor (34 in FIG. 3) to relocate the crane traveller housing the laser measuring means and the ancillary equipment over the electrode to be measured. These operations can also be viewed on large video monitor (38 in FIG. 3) located in the process areas.

If a decision is made to view the results from the first electrode monitored, a suitable key stroke will activate a "data obtained" window on the computer screen displaying the final measurements. A typical format may be as follows:

| Data Electrode No. 2 | | |
|---|---|---|
| Measurement | Calculated Height | Comments |
| Casing | 2 | Low Level |
| Solid | Normal | |
| Average Liquid | 3 | Normal |
| Minimum Liquid | 3 | Normal |

Should the results indicate that additions of solid carbon paste are required, then quantitative additions can be made without excessive delay.

Figure 2:
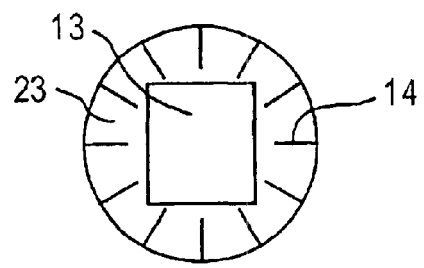
FIG. 2 is an overhead view of the electrode.

FIG. 2 illustrates the top view of the electrode and particularly illustrates the relationship of the solid paste (13) and the liquid paste (23). The electrode is typically 1.8 meters in diameter, with baffles (14) placed approximately 20 cm apart.

Figure 3:
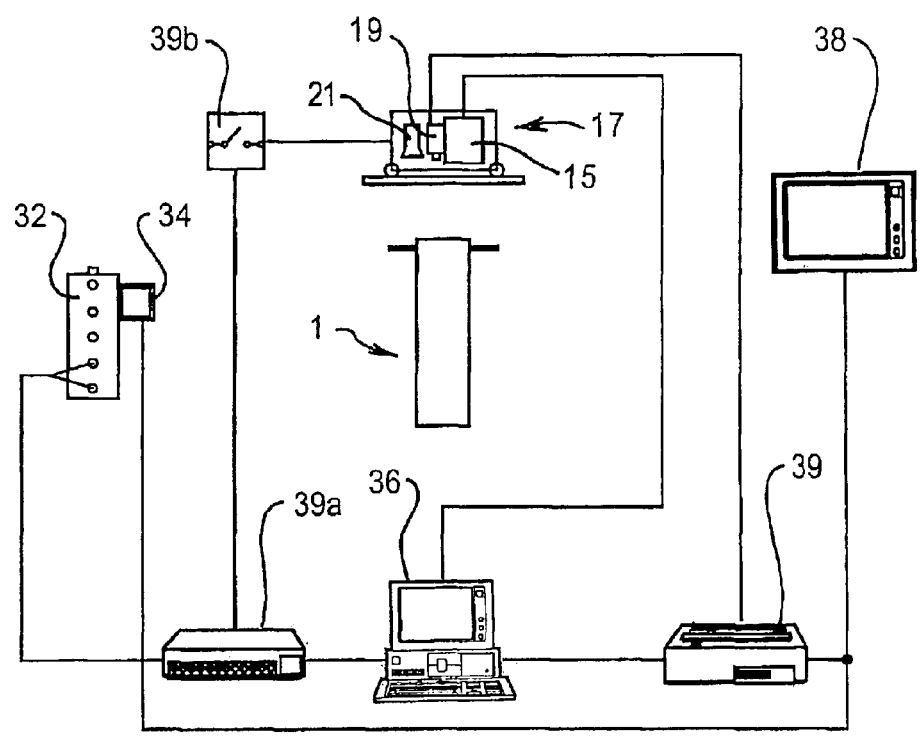
FIG. 3 is a schematic view showing the interrelationship between the laser measuring device and the ancillary components.

With reference to FIG. 3, the laser measuring means (15) chosen for this duty is capable of measurements from 0.2 to 250 m without a reflector with a resolution of 1 cm and an accuracy of ±5 cm. The laser measuring means as described herein is not affected by electrical interference and the data from the laser measuring means is fed to a computer (36) containing computer data processing and storage means. The computer data processing and storage means is able to determine instantaneous parameters relating to the consumable electrode, and display those parameters on video monitor (38). The data is transferred to and form the laser measuring means (15) by electrical connection through junction points (39), (39a) and relay switch (39B).

The computer (36) is also connected to a hand held button controller equipped with a miniature video monitor (34), used to both control the movement of the crane traveller (17) and activate the laser measuring means (15). A video monitor (38) is also provided in the process area.

To ensure that the equipment is protected from the hostile industrial environment in which it is located, the laser measuring means, video camera and computer are housed individually in sealed metal boxes. In the case of the computer, the function and numeric keyboards can be operated externally to the sealed housing. This protection system also facilitates regular maintenance of each component followed by recalibration without exposing all the equipment to the undesirable atmospheric effects.

Figure 4:
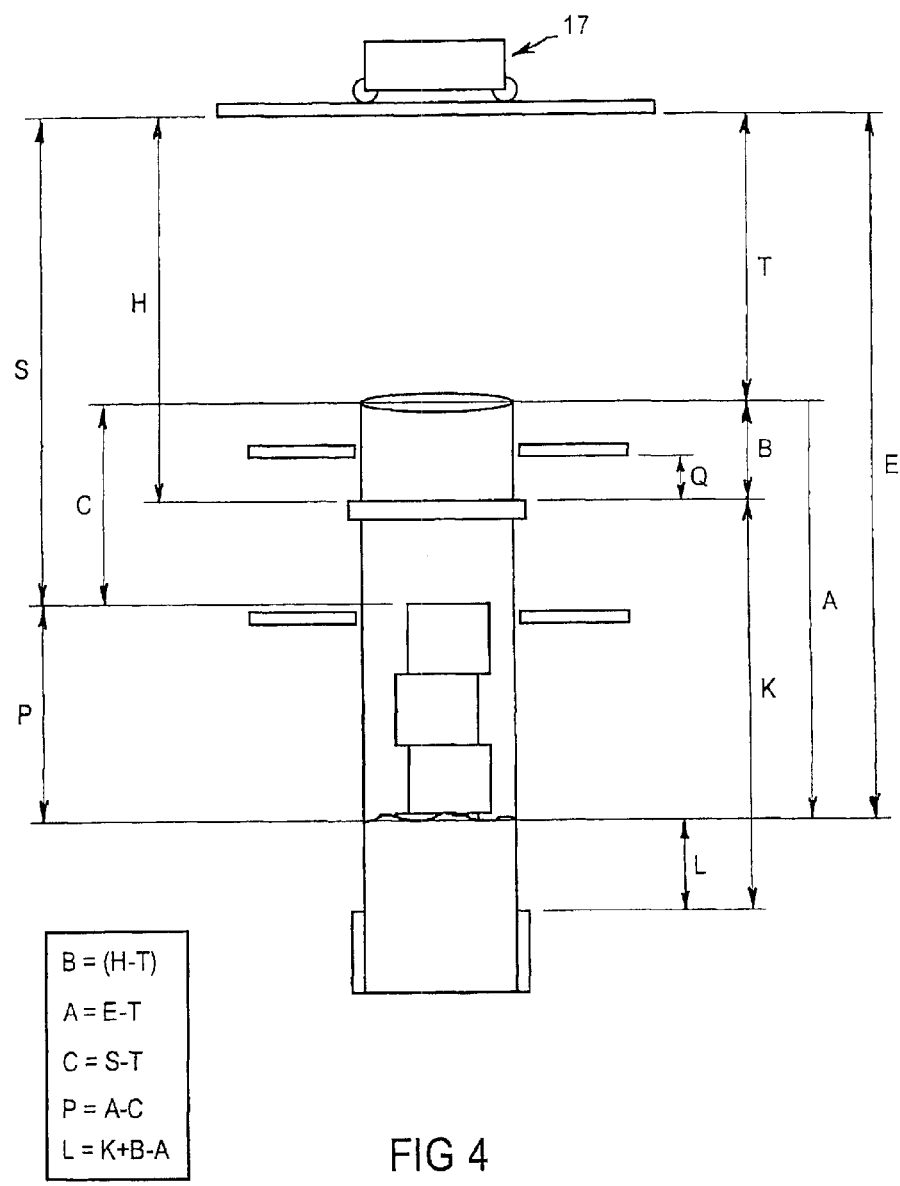
FIG. 4 is a side view of the electrode showing the relationship of the parameters of the electrode casing and its contents to be measured.

With reference to FIG. 4, data relating the consumable electrode is obtained by the laser measuring means located in crane traveller (17). Typical measurements that are obtained include: the distance from the lid (or top) of the electrode to the top of the liquid paste (A);

the length of the casing from the lid of the electrode to the ring holder (B);

the distance from the lid of the electrode to the top of the solid paste (C);

the distance from the laser to the top of the liquid paste (E);

the distance from the laser to the ring holder (H);

the distance from the base of the electrode to the ring holder (K), which should be a constant measurement typically in the order of 10.53 m;

the level of liquid paste above the base of the electrode (L);

the distance from the top of the liquid paste to the top of the solid paste (P);

the distance from loading floor to the ring holder (Q);

the distance from the laser to the top of the solid paste (S); and the distance from the lid of the electrode to the laser (T).

Each of these measurements may be made either directly or by calculation from various measurements. From the information obtained, calculations can be made as to the requirements of the consumable carbon electrode.

The above description is intended to be illustrative of the preferred embodiments of the present invention. It should be understood by those skilled in the art, that many variations or alterations may be made without departing from the spirit or ambit of the invention. Such variations include the many electrical input and output connections and interconnecting equipment items.

The claims defining the invention are as follows:

What is claimed is:

1. A method of measuring the instantaneous parameters of a consumable electrode, said method including the steps of:
    (a) providing a laser measuring means and positioning the laser measuring means in the vicinity of the electrode to be measured;
    (b) activating the laser measuring means to obtain data relating to the instantaneous heights of solid and liquid components of the consumable electrode, the instantaneous height of an electrode casing, the length of the electrode, and the change in length of the electrode over a period of time; and
    (c) transferring the data obtained from the laser measuring means to computer data processing and storage means to determine the instantaneous parameters of the electrode.

2. A method according to claim 1, wherein the laser measuring means is positioned above the electrode to be measured.

3. A method according to claim 1 wherein the consumable electrode is graphite, having a solid and liquid component.

4. A method according to claim 1 wherein the electrode is housed in an iron electrode casing.

5. A method according to claim 1 wherein a video camera and light source are provided with the laser measuring means.

6. A method according to claim 1 wherein the laser measuring means is a laser device capable of measurements from 0.2 to 250 meters without a reflector, with a resolution of 1 cm and an accuracy of +/−5 cm between 10° C. and 30° C.

7. A method according to claim 1 wherein the laser measuring means, video camera and light source are mounted on a crane traveller.

8. A method according to claim 7 including the further step of measuring the instantaneous parameters of a plurality of consumable electrodes by repositioning the laser measuring means sequentially in the vicinity of a further consumable electrodes to be measured.

9. A method according to claim 1, further including the step of providing control means to allow an operator to initiate the laser measuring means, to sequentially determine a series of measurement data, wherein said data is then transferred to the computer data processing and storage means.

10. A method according to claim 9, wherein said control means further allows the operator to reposition the laser measuring means in the vicinity of a further consumable electrode to be measured, aided by use of the video camera to obtain images of the electrode.

11. A method according to claim 9, wherein said control means comprises a control panel, with controls to allow an operator to selectively operate and position the laser measuring means.

12. An apparatus for measuring the instantaneous parameters of a consumable electrode, said apparatus including:
    (a) a laser measuring means capable of obtaining data relating to the instantaneous heights of solid and liquid components of a consumable electrode, the instantaneous height of an electrode casing, the length of the electrode, and the change in length of the electrode over a period of time; and
    (b) computer data processing and storage means capable of determining the instantaneous parameters of a consumable electrode from data obtained from the laser measuring means and transferred to the computer data processing and storage means.

13. An apparatus according to claim 12 further including electronic wiring to transfer data from the laser measuring means to the computer data processing and storage means.

14. An apparatus according to claim 12 further including control means capable of allowing an operator to position and operate the laser measuring means.

15. An apparatus according to claim 12 further including display means, to display the measured instantaneous parameters of the consumable electrode.

16. An apparatus according to claim 12, further including a video camera and a light source.

17. An apparatus according to claim 12, wherein the laser device is capable of measurement from 0.2 to 250 meters without a reflector, with a resolution of 1 cm and an accuracy of +/−5 cms between 10° C. and 30° C. and capable of obtaining data relating to the instantaneous parameters of a consumable electrode.

* * * * *